Feb. 20, 1945.   C. D. STEWART   2,369,989
VARIABLE LOAD BRAKE
Filed Dec. 31, 1942   2 Sheets-Sheet 1

INVENTOR
CARLTON D. STEWART
BY
ATTORNEY

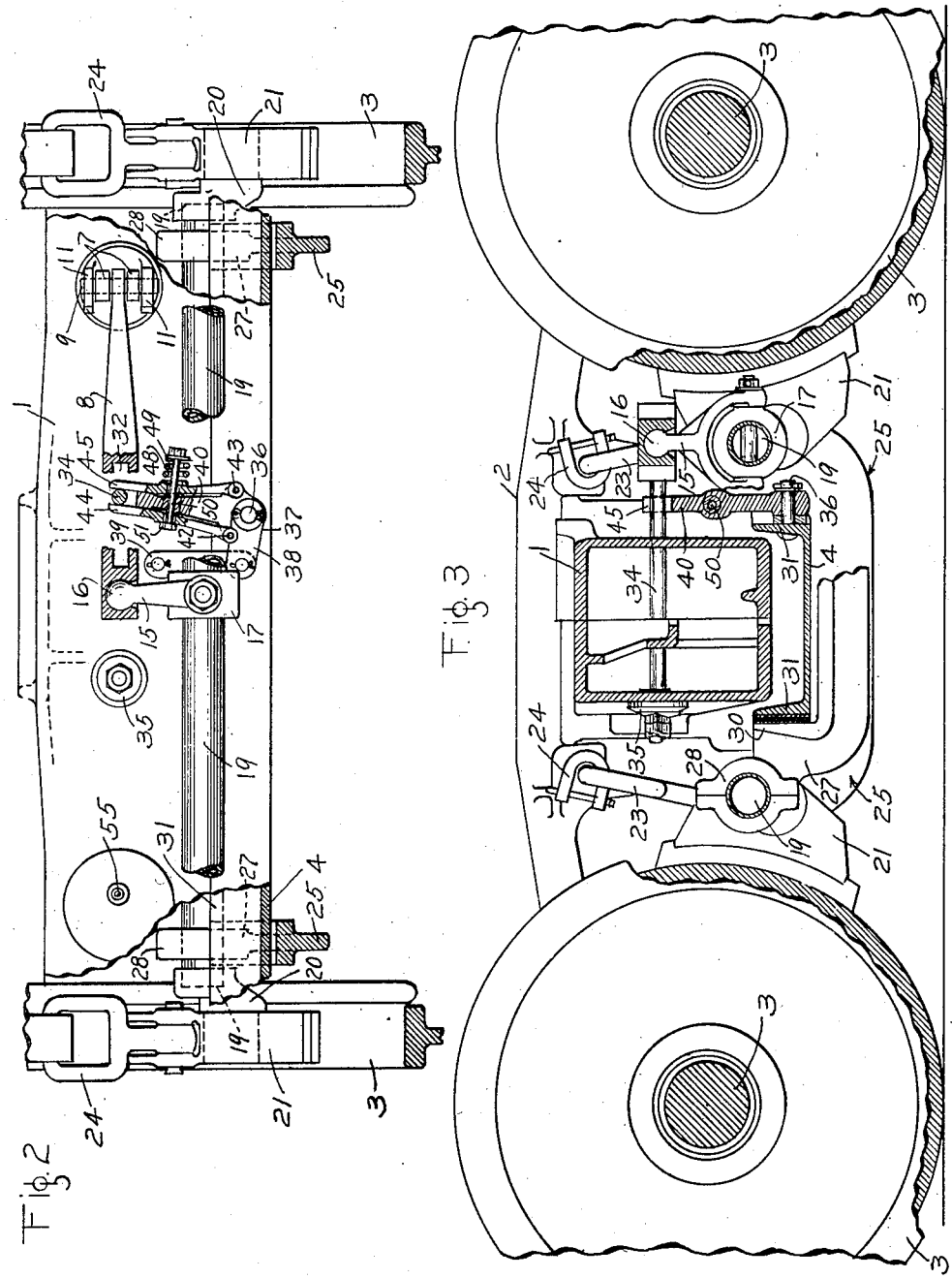

Patented Feb. 20, 1945

2,369,989

UNITED STATES PATENT OFFICE 2,369,989

VARIABLE LOAD BRAKE

Carlton D. Stewart, Wilkinsburg, Pa., assignor to The Westinghouse Air Brake Company, Wilmerding, Pa., a corporation of Pennsylvania Application December 31, 1942, Serial No. 470,855

7 Claims. (Cl. 188—195)

This invention relates to railway vehicle brake rigging and more particularly to variable load brake rigging of the type in which the leverage thereof may be automatically varied in accordance with variations in the weight of the load on the vehicle to correspondingly vary the force with which the brake may be applied.

An object of the invention is to provide a novel variable load brake apparatus of the above mentioned type.

Another object of the invention is to provide a variable load brake apparatus of the above mentioned type including novel means for automatically making the adjustment of the rigging to provide the braking action called for by the weight carried by the vehicle.

Other objects and advantages will appear in the following detailed description of the invention.

In the accompanying drawings,

Fig. 2 is an end elevational view of the same partly in section.

Fig. 3 is a vertical sectional view of the same taken on the line 3—3 of Fig. 1.

Figure 1:
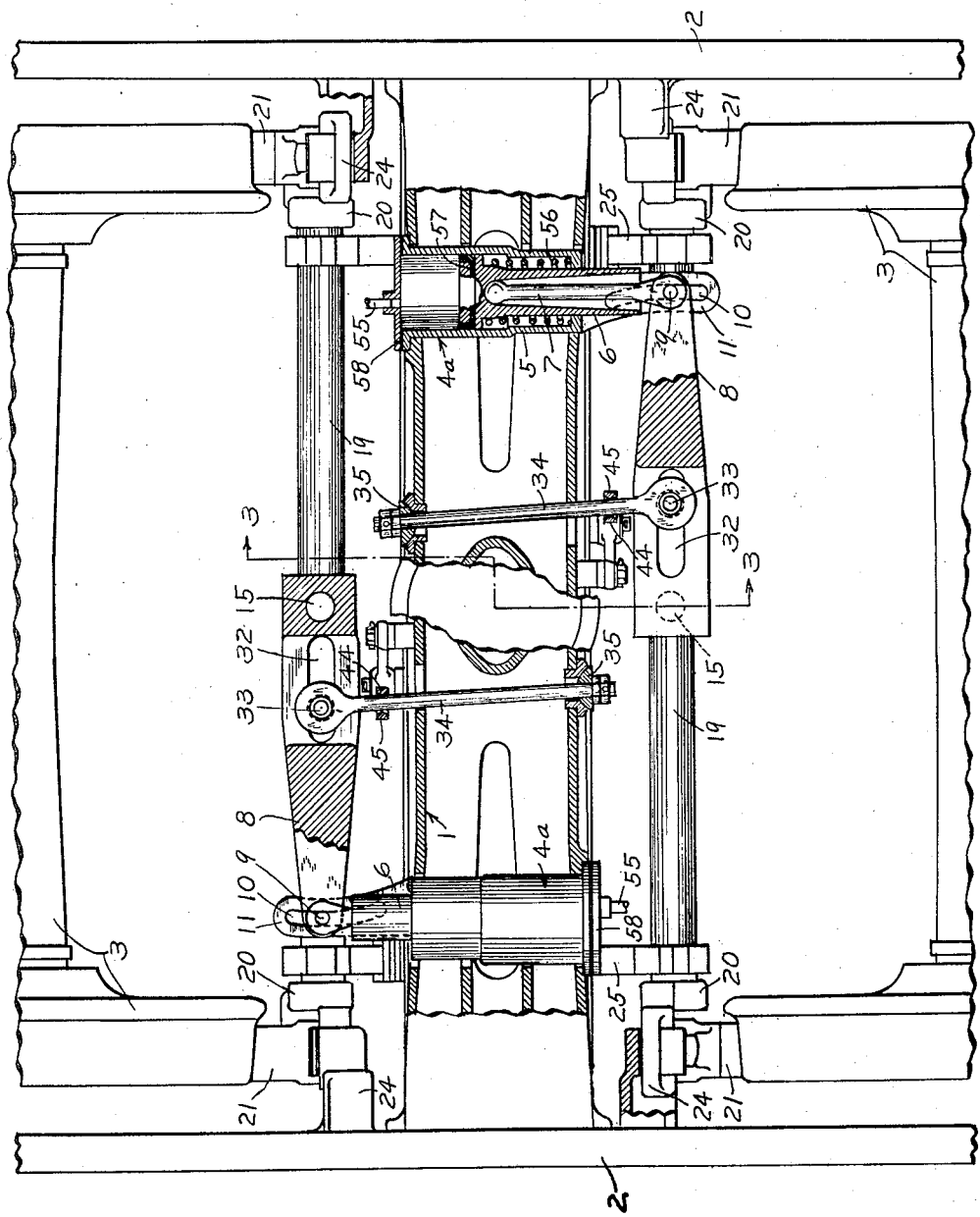
Fig. 1 is a fragmentary plan view, partly in section, of a railway vehicle truck embodying the invention, parts of the truck and the brake rigging being omitted to more clearly illustrate certain details of the invention.

As best shown in Figs. 1 and 3 of the drawings, the variable load brake apparatus is applied to a railway vehicle truck which may be of the usual well known construction having a truck bolster 1, laterally spaced side frames 2 which are rigidly carried in the usual manner by a pair of wheel and axle assemblies 3. Extending transversely of the truck and located below the truck bolster is a spring plank 4 which is fixed to the truck side frames, which spring plank serves to tie the truck frames together and also serves as a seat for the usual truck bolster supporting springs (not shown).

The variable load brake apparatus may comprise two brake cylinder devices 4ª, which are disposed one at each side of the longitudinal center line of the truck. Each brake cylinder device comprises a cylinder 5 which is rigidly but removably secured by any suitable means to the truck bolster 1, the cylinder fitting in suitable openings provided in the vertical side walls of the bolster. Each cylinder contains the usual piston having a hollow piston rod 6 which projects beyond one end of the cylinder. It will be noted that the cylinders 4ª are so arranged that the piston rods 6 extend in opposite directions longitudinally of the truck.

As best shown in Fig. 1 of the accompanying drawings, there is rockably connected to each piston rod 6 a push rod 7. Each push rod 7 is operatively connected at its outer end to one end of a brake cylinder lever 8 by means of a pin 9 which is adapted to travel in a path fixed by a guide slot 10 provided in a bracket 11 carried by the brake cylinder.

The brake cylinder levers 8 are arranged one on each side of the bolster and each extends longitudinally thereof from its respective push rod 7 in a direction toward the longitudinal center line of the truck. At the longitudinal center line of the truck each lever is operatively connected to the upper end of a vertically disposed arm member 15 by means of a ball and socket joint 16, the ball portion of the joint being carried by the arm of the arm member and the socket being formed in the inner end of the lever 8. As best shown in Fig. 3 the arm member 15 is U-shaped having spaced downwardly depending legs which straddle and are attached to a collar 17 which is operatively connected, in any suitable manner, to a rockable shaft 19 which extends longitudinally of the bolster and which is journaled in a manner hereinafter fully described.

The shafts 19 which are disposed one at each side of the bolster extend parallel with the bolster, the ends preferably terminating in the vertical plane of the flanges of the vehicle wheels. Rigidly attached to each end of each shaft is a crank arm 20 which is arranged to carry a brake shoe 21, which shoe is movable into and out of engagement with the tread of the adjacent vehicle wheel, in a manner hereinafter described.

Each brake shoe is connected to one end of a brake hanger 23, which hanger, at its opposite end, is supported by a U-shaped bracket 24 carried by the truck side frame.

In order to maintain the shafts 19 in their proper spaced relationship with each other and with the vehicle wheels and truck bolster, spacer members 25 are provided which are arranged one adjacent each side of the truck. These spacer members each comprise a body portion which extends longitudinally of the truck and which is located below the spring plank 4. Each body portion, at each side of the spring plank, terminates in an upwardly extending portion 27 which carries a bearing portion 28 in which one end of the shaft at that side of the bolster is journaled.

The portion 27 at each end of the body portion is also provided with a vertically extending guide portion 30 which is adapted to slidably engage the outer surface of the adjacent vertically disposed flange 31 of the spring plank 4. These guide portions since they engage the flanges 31, serve to maintain the shafts properly positioned with relation to the spring plank and wheels of the truck against movement in directions longitudinally of the truck.

Each brake cylinder lever 8, between its ends, is provided with a slotted opening 32 which extends longitudinally of the lever and which accommodates a pin 33 which serves as a fulcrum for the lever. The pin 33 is carried by one end of a rod 34 which extends longitudinally of the truck and through accommodating openings in the side walls of the truck bolster. The other end of the rod is anchored to one of the side walls of the truck bolster by means of a swivel connection 35.

Rigidly secured to each flange 31 of the spring plank 4, preferably by welding, and extending outwardly therefrom in the direction of the length of the truck is a pin 36 upon which a bell crank lever 37 is rockably mounted. The arm 38 of this bell crank lever extends in a direction transversely of the truck and is operatively connected to the truck bolster 1 by means of a vertically disposed link 39 which is pivotally carried at its upper end by a projection or pin carried by a side wall of the truck bolster. The other arm 40 of the bell crank lever extends vertically upwardly and carries at its lower end spaced pins 42 and 43. Pivotally mounted on the pins 42 and 43 are spaced arms 44 and 45, respectively, which extend upwardly beyond the upper end of arm 40 and form a forked end which embraces the rod 34, the normal spacing of the arms being fixed by their engagement with the arm 40. The arms 44 and 45 are normally maintained in the position in which they are shown in Fig. 2 of the drawings by a mechanism which comprises a spring 48 interposed between and operatively engaging the arm 45 and a spring seat 49 carried at one end of a rod 50 which passes through the arms 45, 40 and 44 and has screw-threaded engagement with a nut 51 which nut engages arm 44. It will here be noted that the spring acts on the rod 50 to maintain the arm 44 positioned and acts directly upon the arm 45 to maintain it positioned.

It will be understood that any variation in the position of the fulcrum pin 33 with relation to the brake cylinder lever 8 within the slotted opening 32 will result in a variation in the leverage ratio of the brake rigging and thereby a variation in the braking power of the brake rigging for any given brake cylinder pressure.

If the fulcrum pin 33 is moved longitudinally of the lever in a direction away from the brake cylinder the arm to which the brake cylinder is connected, will be correspondingly lengthened so that when the brake cylinder is operated the power transmitted by the opposite end of the lever to the member 15 will be correspondingly increased. If the pin is moved in the slotted opening in a direction toward the push rod 7 the power transmitted to the rod will be decreased.

Operation

Assuming the vehicle, embodying the invention, to be empty and the brakes on the vehicle applied. Under these conditions the several parts of the apparatus will be in the position illustrated in the drawings and the rigging will be conditioned for empty braking.

Inasmuch as the brake cylinder devices 4ª and the mechanism associated with each are substantially identical it will be sufficient, for the purpose of this specification, to describe the operation of only one brake cylinder device and the mechanism associated therewith.

When it is desired to effect a release of the brakes fluid under pressure is vented from the brake cylinder 4ª to the atmosphere by way of a brake cylinder pipe 55 in the usual well known manner. As the pressure of fluid in the brake cylinder is thus reduced, the brake cylinder release spring 56 acts to cause the brake cylinder piston 57 to move in a direction away from the brake cylinder lever 8 until brought to a stop by engagement with the pressure head 58 of the brake cylinder 4ª.

The piston, as it thus moves, causes piston rod 6, push rod 7 and pin 9 carried by the push rod to move in the same direction, the pin 9 moving in the slotted opening 10. Movement of the pin 9 in this direction permits the brake cylinder lever 8 to rock in a counterclockwise direction about the pivot pin 33. As the lever 8 continues to rock in this direction, the arm member 15 is caused to rock in a direction away from the bolster 1. Rocking of the arm member 15 in this direction causes the shaft 19 associated therewith to rotate in the same direction in the supporting bearing 28. Rotation of the shaft in this direction causes the crank arm 20 at each end of the shaft to move the brake shoe 21 out of engagement with the tread of the vehicle wheel to effect a release of the brakes.

It should here be noted that the shafts 19 are maintained spaced apart longitudinally of the truck by the spacer member 25. It should also be noted that the guide portions 30 of the spacer member limit movement of both shafts in directions longitudinally of the truck by engagement with flanges 31 of the spring plank 4.

Assuming now that, while the vehicle brakes are released, lading is placed on the body of the vehicle. Under the influence of the additional weight which the lading imposes on the vehicle body and thereby the truck bolster 1, the bolster springs (not shown) will yield and permit the bolster and the body of the vehicle to move downwardly relative to the spring plank 4. This downward movement of the bolster causes the connected link 39 to move in the same direction, thus causing the bell crank lever 37 to rock in a counterclockwise direction about the pivot pin 36. By reason of this rocking movement the arm 45 carried by the bell crank arm 40 acts to shift the rod 34 in a clockwise direction about the swivel joint 35 as viewed in Fig. 1, carrying the fulcrum pin 33 with it, the pin moving in the slotted opening in the brake cylinder lever 8. From this it will be understood that the fulcrum pin 33 will be automatically positioned relative to the brake cylinder lever 7 to provide for the degree of braking called for by the weight of the lading carried by the vehicle.

It will be understood that the spring 48 has sufficient strength to prevent the arm 45 from moving relative to the arm 40 when the rod 34 is being shifted while the brakes are released.

When it is desired to effect an application of the brakes, fluid under pressure is supplied to the brake cylinder in the usual manner by way of pipe 55. Fluid under pressure thus supplied to the brake cylinder causes the piston and thereby the piston rod 7 and push rod 6 to move outwardly. As the push rod moves in this direction it carries the connected end of the brake lever 8 with it, the pin 9 which connects the push rod to the lever traveling in the slotted opening 10 provided in the bracket 11. As the brake cylinder lever moves in this direction it fulcrums about pin 33 and causes the member 15 and the connected shaft 19, as viewed in Fig. 3, to rock in a direction toward the bolster 1. Rocking of the shaft 19 in this direction causes the crank arms 20 at each end of the shaft to move the brake shoes 21 into frictional engagement with the treads of the wheels of a wheel and axle assemblage of the truck to effect an application of the brakes.

It should here be mentioned that with the brakes applied and the fulcrum pin 33 in any position between the ends of the slotted opening 32, relative movement between the truck bolster 1 and the spring plank 4 will not change the position of the rod 34 and thereby the fulcrum pin 33 for the reason that the spring 48 will yield to such movement and permit either the arm 44 or the arm 45 to move relative to the arm 40 of the bell crank lever, thereby preventing excessive strains from being transmitted from the bolster to the brake rigging.

When it is desired to effect a release of the brake fluid under pressure is again vented from the brake cylinder in the usual manner and the mechanism will operate as hereinbefore described in connection with releasing the brakes on an empty vehicle to release the brakes.

Having now described my invention, what I claim as new and desire to secure by Letters Patent, is:

1. In a variable load brake rigging for a vehicle truck of the type having a fixed spring plank and a truck bolster vertically movable relative to the spring plank in response to variations in the weight imposed on the bolster, in combination, a rockable member operatively connected to a brake member to be operated for effecting either an application or a release of the vehicle brakes, a lever disposed adjacent said truck bolster operatively connected at one end to said rockable member, a brake cylinder carried by said bolster and connected to the other end of said lever, said brake cylinder being operative to actuate said lever and thereby said rockable member and brake member, a slotted opening in said lever extending longitudinally of the lever adjacent a fulcrum for said lever disposed in said slotted opening, a fulcrum carrying member pivotally carried at one end by said bolster for operation to position said fulcrum in said slotted opening, and means carried by said spring plank and operatively connected to said bolster responsive to relative vertical movement between said spring plank and said bolster for actuating said fulcrum carrying member.

2. In a vehicle brake rigging, in combination, a vehicle truck comprising a side frame at each side of the vehicle, a truck bolster extending transversely of the truck, a wheel disposed adjacent each side of said bolster, brake shoes disposed one adjacent each wheel and each being movable into and out of frictional engagement with its respective wheel, rockable means disposed adjacent each side of the bolster, each of said means extending parallel with the bolster and being operatively connected at one end to the brake shoe at the same side of the bolster, means carried by the side frame for supporting said brake shoes and thereby said rockable means at each side of the bolster, a lever disposed at each side of said bolster for actuating the rockable means and thereby the brake shoe at the same side of the bolster, a fulcrum for each lever, carrying means for each fulcrum anchored to said bolster, a brake cylinder operatively connected to each lever operative upon the supply of fluid under pressure thereto to actuate the respective lever, one of said brake cylinders being disposed within the bolster at one end thereof and the other within the bolster at the other end thereof, and means cooperating with said spring plank for maintaining said rockable means parallel with each other, said means being slidable vertically on said spring plank.

3. In a vehicle brake rigging, in combination, a vehicle truck of the type comprising spaced side frames, a member extending transversely of the truck and carried by said side frames, a truck bolster extending transversely of the vehicle and supported at each end from said side frames, a pair of wheels disposed adjacent each side of said truck bolster, a brake shoe for engagement with each wheel, two shafts extending transversely of the truck and arranged one on each side of the truck bolster, each shaft at each end being operatively connected to a brake shoe, means carried by the side frames for supporting said brake shoes and said shafts, a pair of brake cylinders, a brake cylinder lever extending longitudinally of the bolster disposed at each side of said bolster for actuating the shaft at the same side of the bolster, each lever being connected at one end to one of said shafts at a point substantially intermediate the ends of the shaft the other end of each lever being operatively connected to one of said brake cylinders, said brake cylinder being carried by the truck bolster and disposed one at one end of the bolster and the other at the other end of the bolster operative to actuate said levers, and a fulcrum disposed at each side of the bolster for each lever each fulcrum being carried by a rod anchored to said bolster, and means slidably associated with said member of the truck for maintaining said shafts against movement longitudinally of the truck.

4. In a vehicle variable load brake, in combination, a vehicle truck of the type comprising a pair of spaced side frames, spring planks extending transversely of said truck and rigidly carried by said side frames, a truck bolster extending transversely of the truck movable vertically relative to said spring plank in accordance with the weight of the load carried by the vehicle, a pair of wheels disposed adjacent each side of said truck bolster, a brake shoe disposed adjacent each wheel and being so arranged as to be moved into and out of frictional engagement with the wheels, a rockable shaft disposed at each side of the bolster and extending transversely of the truck, each shaft at each end being operatively connected to a brake shoe, means carried by the side frames for supporting the brake shoes and the shafts, means cooperating with said spring plank and shafts for holding said shafts against movement longitudinally of the truck, two brake cylinder levers disposed one at each side of the bolster, each of said levers extending longitudinally of the bolster and being operative to actuate the shaft adjacent the same side of the bolster, a fulcrum for each of said levers movable to different positions relative to the lever for varying the leverage ratio of the lever, and means responsive to relative vertical movement between said bolster and said spring plank for positioning the brake cylinder lever fulcrums.

5. In a vehicle variable load brake, in combination, a vehicle truck of the type comprising a pair of spaced side frames, a spring plank extending transversely of said truck and rigidly carried by said side frames, a truck bolster extending transversely of the truck movable vertically relative to said spring plank in accordance with the weight of the load carried by the vehicle, a pair of wheels disposed adjacent each side of said truck bolster, a brake shoe disposed adjacent each wheel and being so arranged as to be moved into and out of frictional engagement with the wheel, a rockable shaft disposed at each side of the bolster and extending transversely of the truck, each shaft at each end being operatively connected to a brake shoe, means carried by the side frames for supporting the brake shoes and the shafts, means cooperating with said spring plank and shafts for holding said shafts against movement longitudinally of the truck, two brake cylinder levers disposed one at each side of the bolster, the inner end of each lever terminating at the transverse center line of said bolster and being operatively connected to the adjacent shaft, brake cylinders carried by said bolster, each brake cylinder being operatively connected to the outer end of each lever, a fulcrum for each lever movable to different positions relative to the lever for varying the leverage ratio, and means responsive to relative vertical movement between said bolster and said spring plank for positioning the brake cylinder lever fulcrums.

6. In a vehicle variable load brake, in combination, a vehicle truck of the type comprising a pair of spaced side frames, a spring plank extending transversely of said truck and rigidly carried by said side frames, a truck bolster extending transversely of the truck movable vertically relative to said spring plank in accordance with the weight of the load carried by the vehicle, a pair of wheels disposed adjacent each side of said truck bolster, a brake shoe disposed adjacent each wheel and being so arranged as to be moved into and out of frictional engagement with the wheel, a rockable shaft disposed at each side of the bolster and extending transversely of the truck, each shaft at each end being operatively connected to brake shoe, means carried by the side frames for supporting the brake shoes and the shafts, means cooperating with said spring plank and shafts for holding said shafts against movement longitudinally of the truck, two brake cylinder levers disposed one at each side of the bolster, each of said levers extending longitudinally of the bolster and being operative to actuate the shaft adjacent the same side of the bolster, a fulcrum for each of said levers movable to different positions relative to the lever for varying the leverage ratio of the lever, a lever arrangement responsive at one time to relative vertical movement between said bolster and said spring plank for positioning each fulcrum, and means associated with said lever arrangement operative at another time to render the lever arrangement ineffective to position said fulcrum in response to relative vertical movement between said bolster and said spring plank.

7. In a vehicle variable load brake, in combination, a vehicle truck of the type comprising a pair of spaced side frames, a spring plank extending transversely of said truck and rigidly carried by said side frames, a truck bolster extending transversely of the truck movable vertically relative to said spring plank in accordance with the weight of the load carried by the vehicle, a pair of wheels disposed adjacent each side of said truck bolster, a brake shoe disposed adjacent each wheel and being so arranged as to be moved into and out of frictional engagement with the wheel, a rockable shaft disposed at each side of the bolster and extending transversely of the truck, each shaft at each end being operatively connected to a brake shoe, means carried by the side frames for supporting the brake shoes and the shafts, means cooperating with said spring plank and shafts for holding said shafts against movement longitudinally of the truck, two brake cylinder levers disposed one at each side of the bolster, each of said levers extending longitudinally of the bolster and being operative to actuate the shaft adjacent the same side of the bolster, a fulcrum for each of said levers movable to different positions relative to the lever for varying the leverage ratio of the lever, a floating rod pivotally carried by said bolster for positioning said fulcrum, and means including a bell crank lever pivotally carried by said spring plank and operatively connected to said bolster for actuating said floating rod in response to relative vertical movement between said bolster and said spring plank.

CARLTON D. STEWART.